(12) United States Patent
Jürs

(10) Patent No.: US 9,149,047 B2
(45) Date of Patent: Oct. 6, 2015

(54) DEVICE FOR PROCESSING FISH

(71) Applicant: Nordischer Maschinenbau Rud. Baader GmbH + Co. KG, Lubeck (DE)

(72) Inventor: Michael Jürs, Neustadt (DE)

(73) Assignee: Nordischer Maschinenbau Rud. Baader GmbH + Co. KG, Lubeck (DE)

( * ) Notice: Subject to any disclaimer, the term of this patent is extended or adjusted under 35 U.S.C. 154(b) by 0 days.

(21) Appl. No.: 14/417,090

(22) PCT Filed: Jul. 15, 2013

(86) PCT No.: PCT/EP2013/064939
§ 371 (c)(1),
(2) Date: Apr. 16, 2015

(87) PCT Pub. No.: WO2014/016160
PCT Pub. Date: Jan. 30, 2014

(65) Prior Publication Data
US 2015/0216194 A1    Aug. 6, 2015

(30) Foreign Application Priority Data

Jul. 24, 2012 (DE) .......................... 10 2012 106 711

(51) Int. Cl.
*A22C 17/00* (2006.01)
*A22C 25/08* (2006.01)
*A22C 25/16* (2006.01)

(52) U.S. Cl.
CPC ................. *A22C 25/08* (2013.01); *A22C 25/16* (2013.01)

(58) Field of Classification Search
USPC ......... 452/149–153, 155, 160–163, 165, 166, 452/170
See application file for complete search history.

(56) References Cited

U.S. PATENT DOCUMENTS 2,961,696 A    11/1960  Johannes
3,885,270 A *  5/1975   Dohrendorf .................. 452/170
(Continued)

FOREIGN PATENT DOCUMENTS

DE    1237750 B    3/1967
DE    1454087 A1   2/1969
(Continued)

OTHER PUBLICATIONS

International Preliminary Report on Patentability dated Jan. 27, 2015 from International Patent Application No. PCT/EP2013/064939 filed Jul. 15, 2013.

(Continued)

*Primary Examiner* — Richard Price, Jr.
(74) *Attorney, Agent, or Firm* — Sunstone IP

(57) ABSTRACT

The invention relates to an L-shaped supporting body for accommodating a fish and for conveying said fish tail first through a cutting unit having a circular blade pair of a fish processing apparatus, which has a continuously revolving conveyor, wherein the supporting body has a main body for fastening said supporting body to the conveyor and a bearing web, which protrudes beyond a side wall of the main body and which has a supporting edge arranged at the top for accommodating the backbone of the fish to be accommodated, the bearing web having a groove arranged on the underside, which groove is designed as a counter-support for the circular blade pair. In addition, the invention relates to a corresponding apparatus for processing fish.

11 Claims, 3 Drawing Sheets

(56) References Cited

U.S. PATENT DOCUMENTS

| | | | | |
|---|---|---|---|---|
| 4,559,672 | A | * | 12/1985 | Hazenbroek et al. ......... 452/166 |
| 4,589,855 | A | * | 5/1986 | Ragaly ............................ 464/36 |
| 4,811,460 | A | * | 3/1989 | Emanuelsen ................. 452/118 |
| 5,562,532 | A | * | 10/1996 | Horst et al. ................... 452/149 |
| 5,951,393 | A | * | 9/1999 | Barendregt ................... 452/165 |
| 7,927,194 | B2 | * | 4/2011 | Jurs et al. ..................... 452/135 |
| 8,641,487 | B1 | * | 2/2014 | Ray et al. ..................... 452/149 |
| 8,845,402 | B2 | * | 9/2014 | Janssen ........................ 452/136 |
| 2013/0035023 | A1 | * | 2/2013 | Jurs .............................. 452/162 |

FOREIGN PATENT DOCUMENTS

| | | |
|---|---|---|
| DE | 3403771 C1 | 12/1984 |
| DE | 4318810 A1 | 12/1994 |
| GB | 811199 A | 4/1959 |
| GB | 866436 A | 4/1961 |

OTHER PUBLICATIONS

International Search Report dated Mar. 3, 2014 from International Patent Application No. PCT/EP2013/064939 filed Jul. 15, 2013.

* cited by examiner

DEVICE FOR PROCESSING FISH

BACKGROUND OF THE INVENTION

1. Field of the Invention

The invention relates to an L-shaped supporting body for accommodating a fish and for conveying said fish tail first through a cutting unit with a circular blade pair of a fish processing apparatus, which has a continuously revolving conveyor, wherein the supporting body has a main body for fastening said supporting body to the conveyor and a bearing web, which protrudes beyond a side wall of the main body and which has a supporting edge arranged at the top for accommodating the backbone of the fish to be accommodated.

2. Related Technology

Moreover, the invention relates to an apparatus for processing fish, comprising a cutting unit, wherein the cutting unit has a circular blade pair for cutting free the backbone and a conveyor unit with a continuously revolving conveyor and at least one L-shaped supporting body for accommodating the fish and for conveying said fish tail first through the cutting unit wherein each supporting body has a main body attached to the conveyor and a bearing web protruding beyond a side wall of the main body and which has a supporting edge arranged at the top for accommodating the backbone of each fish to be processed.

BRIEF SUMMARY OF THE INVENTION

Such supporting bodies and/or apparatuses are used in the fish processing industry to separate the fillets from the skeleton of the fish. Put more precisely, the ventral spokes are cut free. To do this, two circular blades forming a circular blade pair in each case engage with the fish from underneath for the belly incisions. The circular blades are driven rotatingly about an axis, the axis running transverse to a conveying direction of the conveyor. For the cutting free process, the fish in the conveying direction is conveyed with its ventral side through the circular blade pair, the fish or the backbone (spinal column) of the fish, which rests on the supporting edge of the supporting body, defining a transport plane. At the same time, the upper region in particular of the supporting body, preferably with said supporting body's supporting edge, can be saddle-shaped. The L-shaped design of the supporting body, however, is essentially characterised by the protruding bearing web. The two circular blades for the belly incisions are located underneath the transport plane. To transport the fish, the upper side of each bearing web is provided with a supporting edge. Each bearing web preferably has teeth on its upper side which hook into each backbone of the fish and/or their vertebral processes and thus bring about a positive locking connection. The supporting edge can therefore be used to create a non-positive locking and/or a positive locking connection with the backbone of the fish. For some types of fish, it is sufficient to provide one row of teeth. Salmonid fish species in particular have a backbone from which backbone, in the region of the abdominal cavity, the rib appendages protrude evenly at a narrow angle over the entire length of said backbone such that the teeth interlock centrally under the backbone. The rib appendages sticking out at a narrow angle from the backbone may at the same time create what resembles a guide such that the backbone always rests centrally on the supporting edge. In fish species such as Alaska pollock, hake, cod, haddock or whiting with a beheaded fish length of 18 to 38 cm, the backbone has a diameter of approx. 3 to 5 mm. To achieve the highest yield possible, it is provided that the two circular blades of the circular blade pair cut or are arranged on the right and left respectively next to the backbone or next to the spokes protruding from said backbone. The two circular blades of the circular blade pair are thus spaced apart from each other in order to enable each fish to be conveyed through or between the circular blades. It may therefore be provided that the circular blades are spaced apart from each other by a gap of between 3.5 mm and 5 mm. The circular blades are preferably spaced apart from each other by a gap of 4 mm.

To enable the fish to be transported through the cutting unit, the supporting body or each supporting body has a main body and a bearing web. They may be arranged in an L-shape to each other. For this the main body of the supporting body is attached to the conveyor or is at least designed and/or adapted for this. The bearing web in this case adjoins the end of the main body directed away from the conveyor and laterally overhangs a side wall of the main body. It is provided in this case that the supporting body per se is designed in one piece.

To permit the most precise and clean cut possible using the circular blade pair, it is known from prior art that the or each bearing web has a protruding guiding edge on the underside. The guiding edge serves to guide the circular blades when conveying fish through the cutting unit. The guiding edge further serves as a counter-support or as a cutting counter-support for the circular blade pair. It was explained previously that the circular blades are spaced a small distance apart from each other such that the guiding edge, which when conveying the fish through the cutting unit is also guided centrally through the circular blade pair, has a width adjusted to the gap between the circular blade pair of, for example, 4 mm. In practice, however, it has been shown that the guiding edge can unintentionally come into contact with the circular blade pair when conveying fish through the cutting unit. There is also a danger that the guiding edge will run laterally past the ventral blade pair (i.e. not centrally through the ventral blade pair). As a consequence of this, it is possible that the supporting body will jump out of a guide assigned to the conveyor unit before a safety element, such as a friction clutch, interrupts further conveying. In this case, damage to machine components is inevitable. The fault explained above occurs increasingly as the apparatus for processing fish increases in age along with the wear often associated with this. The wear of machine components, in particular on the conveyor unit, has even wider implications. To achieve the highest yield possible, it is provided that the outer circular blade edges (or the cutting edges) of each circular blade is guided as closely as possible past the underside of the bearing web in order to cut free the ventral spines as close as possible to the backbone. Based on the wear referred to above, however, it has been shown in practice that the gap between the underside of the bearing web and the outer edge of the circular blade can decrease unintentionally to such an extent that mechanical contact occurs between the bearing web and the circular blade pair or the cutting edges thereof. In this case, the circular blade pair becomes blunt and subsequently has poor cutting properties. Fish cut with such a blunt circular blade pair are therefore cut very badly and the quality of the processed fish decreases.

Thus the object of the invention is to create a simple and inexpensive supporting body for accommodating and conveying fish and/or a simple and inexpensive apparatus for processing fish which enables the backbone of the fish to be cut free in an improved manner.

The object is achieved by an L-shaped supporting body having the features referred to hereinbefore such that the bearing web has a groove arranged at the bottom, which groove is designed as a counter-support for the circular blade pair.

The object is further achieved by an apparatus having the features referred to hereinbefore such that each bearing web has a groove arranged at the bottom, which groove is designed as a counter-support for the circular blade pair.

The yield when processing fish can be increased by using a groove. This is because the groove enables the circular blade pair to be brought closer to the backbone. Alternatively and/or additionally, when conveying fish through the cutting unit the groove can be used as a counter-support for the circular blade pair. The groove is preferably aligned underneath the supporting edge and/or parallel and/or centrally thereto. Moreover, the groove of the bearing web does not create an interfering contour between the circular blades of the circular blade pair. The circular blades can therefore be arranged almost as close to each other as desired. Particularly when processing small fish, an especially small gap can be selected for this purpose between the circular blades of the circular blade pair. Moreover, the bearing web can be designed such that it is very rigid thus reducing the risk that the circular blade pair will unintentionally collide with the bearing web. In fact, the groove can be used as a guide and/or counter-support for the circular blade pair.

A further advantageous embodiment of the invention is characterised in that the groove of each bearing web extends over the entire length of said bearing web. The length in this case is the length of the bearing web viewed in the conveying direction of the conveyor. In other words, it may be provided that the groove extends continuously over the bearing web. It is therefore possible, with unslaughtered fish, to slit open the belly along its entire length, too.

The groove may particularly be understood to be an elongated recess on the underside of the bearing web. Moreover, the groove of each bearing web can be limited by two lateral groove walls and a groove base.

A further advantageous embodiment of the invention is characterised in that the groove walls of each bearing web are arranged conically to each other in the region of an introductory section. This introductory region can therefore be used to introduce the circular blade pair into the groove. This effectively and simply prevents destructive contact between the circular blade pair and the bearing web. In addition, the mechanical load on the conveyor is reduced, in particular on a guide of the conveyor.

A further advantageous embodiment of the invention is characterised in that the groove walls of each bearing web are aligned parallel to each other, preferably up to the introductory section. As a result of this parallel alignment of the groove or the groove walls, the supporting body can be conveyed by means of a linear guide unit of the conveyor or the conveyor unit. It is therefore possible to manufacture the apparatus particularly cost effectively.

An advantageous embodiment of the invention is characterised in that the or each bearing web protrudes beyond the associated main body of the supporting body transverse to a conveying direction of the conveyor and/or transverse to a longitudinal direction of the groove. It is therefore not necessary for the supporting body to be guided between the circular blades of the circular blade pair in order to convey a fish to be processed through the cutting unit. Rather it is possible, based on the aforementioned embodiments, for the bearing web to be conveyed above the circular blade pair, the circular blade exposing the belly spokes and cutting open the belly of the fish to be processed, if fish is processed without a slaughtering incision. The circular blade pair is therefore also referred to as the ventral blade pair.

A further advantageous embodiment of the invention is characterised in that the groove of the or of each bearing web is oriented in a conveying direction of the conveyor and/or in a rotational plane of the circular blade pair. It is therefore possible to arrange the cutting unit stationary to the conveyor unit. It is therefore additionally possible to prevent the circular blade pair from having to track the groove.

A further advantageous embodiment of the invention is characterised in that the circular blade pair can be brought out of a waiting position into a working position and/or vice versa using a positioning element of the cutting unit. Using the positioning element, it is particularly easily and effectively possible to prevent the circular blade pair from nevertheless colliding with a component of the conveyor unit and/or the conveyor and/or the supporting body. The circular blade pair can be brought into the waiting position to avoid such elements. To enable the backbone to be cut free, the circular blade pair can be brought out of the waiting position into the working position, the respective fish being conveyed through the cutting unit by the supporting body. Afterwards, the circular blade pair can be brought back into the waiting position.

A further advantageous embodiment of the invention is characterised in that the or each supporting body is guided by means of the conveyor while conveying fish through the cutting unit in such a manner that the circular blade pair engages in the groove of the associated bearing web. As a result, the circular blade pair, in particular the outer cutting edge thereof, can be brought particularly close to the backbone of the fish to be processed. Consequently, a particularly high yield can be achieved. Due to the engagement of the circular blade pair, at least part of the circular blade is arranged laterally to the walls of the groove (also referred to as the groove walls). In this way the groove can serve as a counter-support and/or cutting counter-support for the circular blade pair in the event that unslaughtered fish are processed.

It has already been explained previously that the groove of the or each bearing web is preferably limited by two lateral groove walls and a groove base. A further advantageous embodiment of the invention is characterised in that a gap between the two groove walls of the or of each bearing web corresponds to a gap between the circular blades of the circular blade pair. Thus it is possible for the circular blades of the circular blade pair to be guided particularly closely past the respective groove walls and that the fish can therefore be cut particularly cleanly. In addition, the groove walls can also be used to guide the circular blades of the circular blade pair.

A further advantageous embodiment of the apparatus is characterised in that the circular blade pair is spaced apart from the associated groove base on engaging in the groove of the, in particular of each, bearing web. Consequently, it is possible to prevent mechanical contact between the groove base and the circular blade pair. This also guarantees that the circular blade pair also remains sharp even over a longish operating period. If the supporting body drops slightly due to wear of the conveyor, it is possible to ensure, as a result of the gap between the groove base and the circular blade pair, that at least in the case of slight wear no contact will occur between said groove base and said circular blade pair. The advantages referred to previously are therefore also valid in combination with this advantageous property.

BRIEF DESCRIPTION OF THE DRAWINGS

Other advantageous features of the invention will become obvious from the description of the embodiment according to the invention together with the claims and/or the attached drawings. In this case, embodiments according to the invention may fulfil or reflect individual features or a combination of a plurality of features. Without restricting the general inventive idea, the invention is described in the following based on an embodiment and with reference to the figures. Identical or similar or corresponding parts will be given the same reference numerals in each case so that there will be no need for repeated introduction in each case. The drawings show:

DETAILED DESCRIPTION OF SOME EXAMPLE EMBODIMENTS

Figure 1:
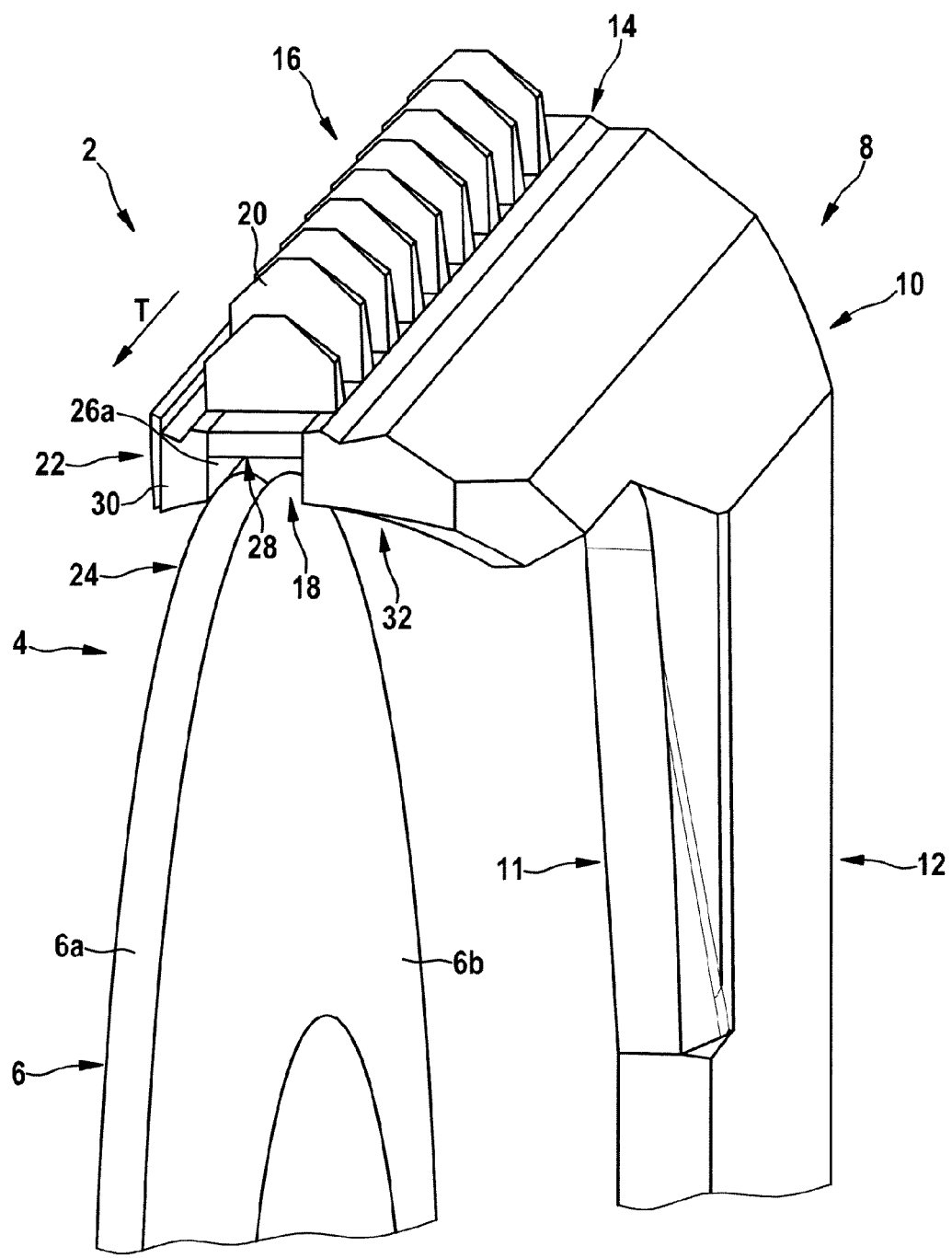
FIG. 1 a schematic diagram of the apparatus in axonometric projection.

Referring to the schematic representation of FIG. 1, the invention relates to an L-shaped supporting body 10 for accommodating a fish and for conveying said fish tail first, through a cutting unit 4 having a circular blade pair 6 of a fish processing apparatus, which has a continuously revolving conveyor, wherein the supporting body 10 has a main body 12 for fastening said supporting body to the conveyor and a bearing web 14, which protrudes beyond a side wall 11 of the main body 12 and which has a supporting edge 16 arranged at the top for accommodating the backbone of the fish to be accommodated, characterised in that the bearing web 14 has a groove 18 arranged on the underside. Here it is provided that the groove is designed as a counter-support for the circular blade pair 6.

In addition, the invention relates to an apparatus 2 for processing fish, comprising a cutting unit 4 wherein the cutting unit 4 has a circular blade pair 6 for cutting free the backbone and a conveyor unit 8 with a continuously revolving conveyor (not illustrated) and at least one L-shaped supporting body 10 for accommodating the fish and for conveying said fish tail first through the cutting unit 4, wherein each supporting body 10 has a main body 12 attached to the conveyor and a bearing web 14 protruding beyond a side wall 11 of the main body 12 and which has a supporting edge 16 arranged at the top for accommodating the backbone of the fish to be processed in each case and wherein each bearing web 14 has a groove 18 arranged on the underside. Here it is provided that the groove is designed as a counter-support for the circular blade pair 6.

Figure 2:
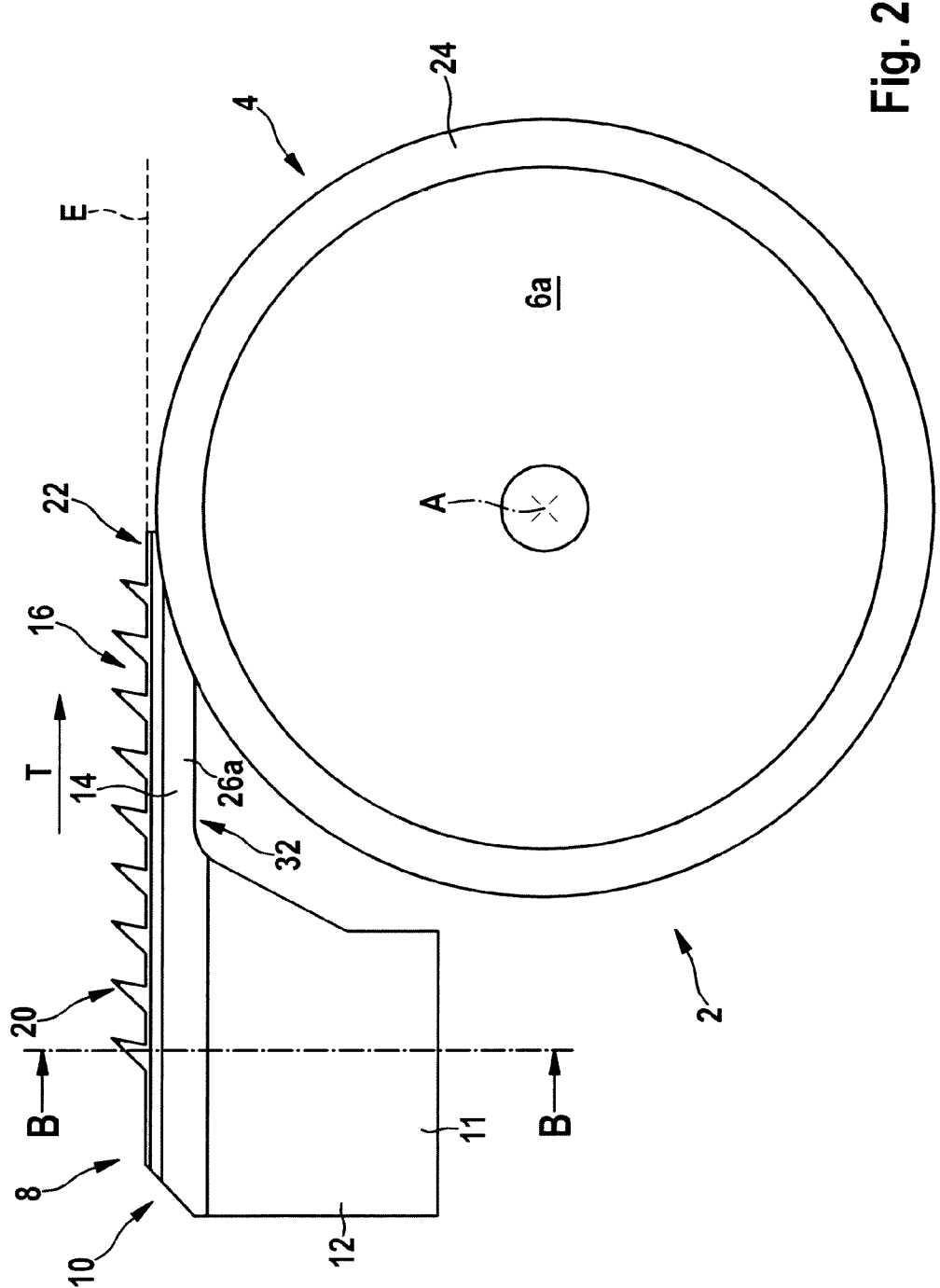
FIG. 2 a lateral view of the apparatus.

Conveyor unit 8 preferably comprises a plurality of supporting bodies 10 arranged spaced apart from each other. These L-shaped supporting bodies 10, which are also referred to as transport saddles, are firmly but detachably arranged on the revolving conveyor and likewise revolve with it. Each supporting body 10 is designed and/or aligned to accommodate fish. The fish saddled on the supporting bodies 10 can also be transported or conveyed through the cutting unit 4 by a drive of the conveyor. For fixing fish on the supporting body 10, said supporting body has a supporting edge 16 on the upper side. For this, teeth or profiles 20, which preferably extend over the entire length of the bearing web 14, are arranged on the upper side. The teeth or tines 20 may be configured in one, two or a plurality of rows. Extending in conveying direction T, the bearing web 14 opens into a nose or a horn 22. The orientation of the teeth or tines 20 is variable. The teeth or tines 20 are preferably inclined in conveying direction T. Other configurations and/or inclinations of the teeth or tines 20 are also possible. The thickness and/or width of the bearing web 14 and/or supporting body 10 is greater than the distance between the circular blades 6a, 6b of the circular blade pair 6. In order to convey fish through the cutting unit 4, the bearing web 14 protrudes beyond a side wall of the main body 12 of the supporting body 10. In other words, the supporting body 10 is L-shaped, the main body 12 forming the vertical region of the supporting body 10 and the bearing web 14 forming the horizontal region of the supporting body 10. If a beheaded and gutted fish lies with its backbone on the supporting edge 16 of the bearing web 14 or supporting body 10, the fish can be conveyed through the cutting unit 4 in conveying direction T tail first and with its back upwards. In this case, the fish or its backbone or the supporting edge 16 defines a transport plane E, as is illustrated for example in FIGS. 2 and 3.

The cutting unit 4 which is preferably adapted and/or designed for filleting fish has at least one circular blade pair 6. The rotatingly driven circular blade pair 6 is designed and adapted in a known way for cutting free the belly spokes or ventral bones. It is further provided that the plane of the circular blade pair 6a, 6b is aligned transverse to transport plane E. Thus the common rotary axis A of the circular blades 6a, 6b of the circular blade pair 6 is preferably aligned at a right angle to conveying direction T. The spaced circular blades 6a, 6b of the circular blade pair 6 are thus aligned parallel and/or coaxially to each other.

As mentioned at the outset, it is particularly relevant for achieving a high yield that the incision for cutting free the backbone is made as close as possible to said backbone. It is therefore provided that the or each bearing web 14 has a groove 18 arranged on the underside. In this case, the groove 18 can be used as a counter-support for the circular blade pair 6 when conveying fish through the cutting unit 4. It is therefore provided that the groove 18 is designed as a counter-support and/or cutting counter-support for the circular blade pair 6. In this case, this is an outer counter-support and/or a counter-support or a cutting counter-support arranged outside the circular blade pair 6. This groove 18 of the bearing web 14 or the supporting body 10 permits the backbone of a fish to be cut free particularly close to the transport plane E or to the backbone itself using the circular blade pair 6 of the cutting unit 4. In other words, the circular blade pair 6 can cut closer to the backbone of the fish to be processed, particularly in the region in front of nose 22 of the bearing web 14, by approximately the depth of the groove 18 in order to expose the backbone. In this case, the cutting counter-support formed by the groove 18 is arranged outside on the circular blade pair 6. Circular blades 6a, 6b of the circular blade pair 6 can therefore be arranged particularly close to each other side by side in order to cut closer to the belly spokes. In other words, the groove 18 (unlike a web) does not create an interfering contour arranged between the circular blades 6a, 6b of the circular blade pair 6. The circular blades 6a, 6b or the circular blade pair 6 can therefore be adjusted with particular ease to a desired distance from each other. If it is necessary, for example, for the circular blades 6a, 6b to have a gap of 3 mm for particularly small fish, the groove 18 does not prevent this. In other words, the distance between the circular blades 6a, 6b of the circular blade pair 6 can be variably adjusted to the fish to be processed without having to modify the supporting body 10.

Figure 3:
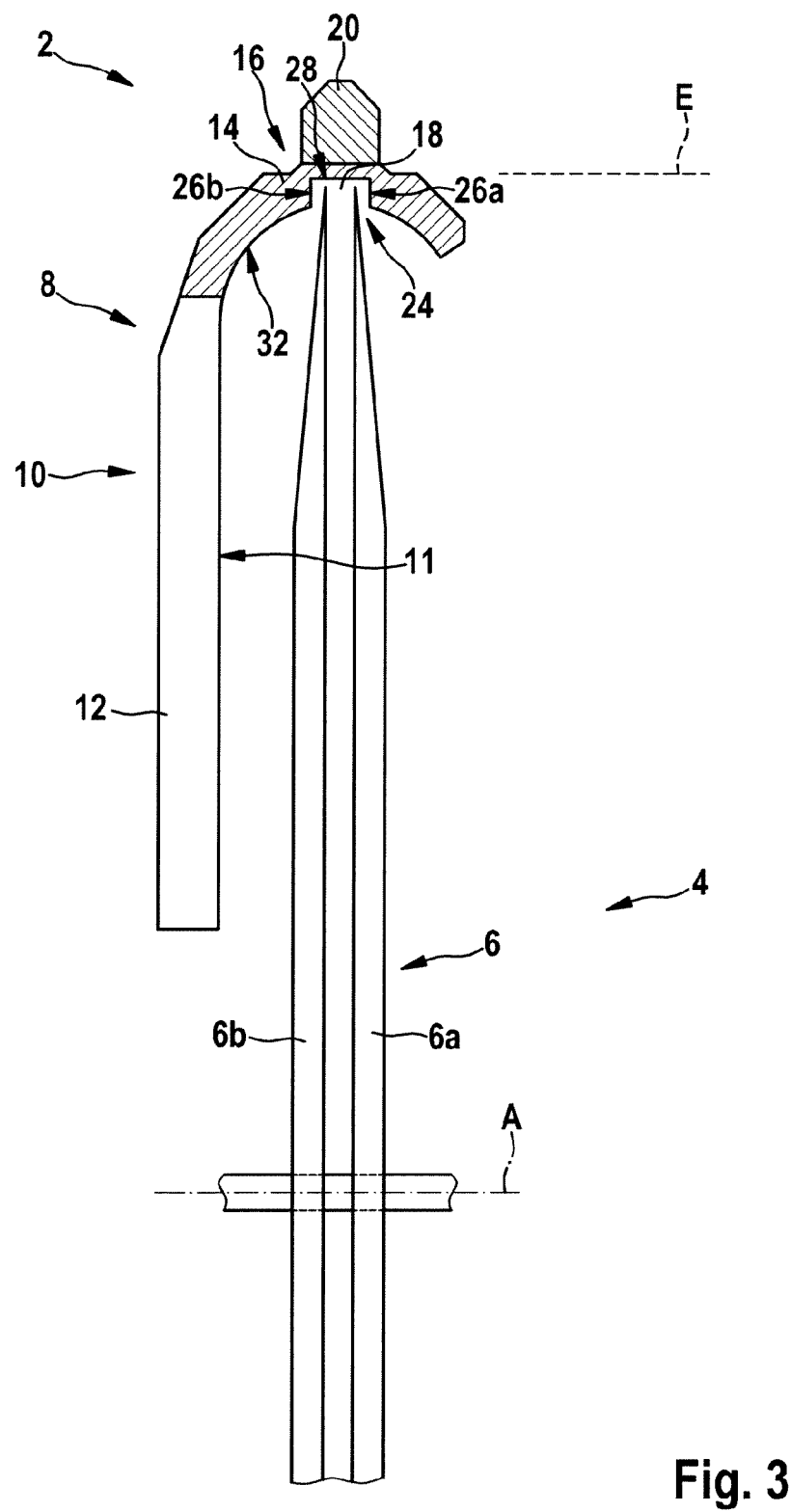
FIG. 3 a sectional representation of the apparatus according to a section B-B illustrated in FIG. 2.

In practice it has proven particularly advantageous if each supporting body 10 is guided by means of the conveyor when conveying fish through the cutting unit 4 in such a way that the circular blade pair 6 engages in the groove 18 of the associated bearing web 14. As illustrated in FIG. 3, the outer cutting edge 24 (that is the cutting edge directed away from rotary axis A) of the relevant circular blade 6a, 6b of the circular blade pair 6 engages at the same time in the groove 18 of the bearing web 14. The gap between the transport plane E or the backbone and the cutting edge 24 can thus be reduced to a minimum. Engagement per se can begin at the horn 22 of the bearing web 14 when conveying fish. While conveying the fish through the cutting unit 4 by means of the supporting body 10, engagement can pause and can terminate on reaching the end of groove 18 opposing the horn 22. In other words, the circular blade pair 6 engages in the relevant groove 18 of the associated bearing web 14 while conveying the fish by means of the relevant supporting body 10. This makes it possible to achieve a particularly precise and repeatable incision.

Moreover, it is preferably provided that the or each bearing web 14 protrudes beyond the associated main body 12 of the supporting body 10 transverse to a conveying direction T of the conveyor and/or transverse to a longitudinal extension of the groove 18. It is also possible with such an embodiment to process particularly small fish, in particular with a beheaded length between 18 and 38 cm, or to cut free their respective backbones. Compared to so-called central saddle supporting bodies, which are guided through centrally between circular blades 6a, 6b of a circular blade pair 6 when conveying fish, the gap between circular blades 6a, 6b can be reduced without regard for the thickness of the main body 12 of a supporting body 10 in an embodiment according to the invention explained previously. In other words, when using a central saddle supporting body, the gap between the blades can only be reduced to the thickness of the supporting body 10, as otherwise it would create an interfering contour for the circular blade pair 6. These disadvantages, however, are overcome by the embodiment according to the invention referred to previously.

An advantageous embodiment of the invention is characterised in that the groove 18 of the or each bearing web 14 extends over the entire length of said bearing web. In this case, the length is viewed in conveying direction T. In other words, the groove 18 is preferably of a continuous design. It is therefore possible for the circular blade pair 6 to engage in the groove 18 on the horn 22 and/or for the supporting body 10 or the bearing web 14 to pass the circular blade pair 6 in this engaged state. Therefore no additional and/or rendered vertical alignment of the circular blade pair 6 is required. It is therefore particularly easy to guarantee that the backbones are cut free.

It has also proven advantageous if the groove 18 of the or each bearing web 14 is aligned in a conveying direction T of the conveyor and/or in a rotational plane of the circular blade pair 6. It can therefore be ensured that the supporting body 10 can be guided past the circular blade pair 6 in a translational motion. For this the conveyor may have a corresponding linear guide for translational guiding of the supporting body 10.

For an advantageous embodiment of the invention, it is provided that the groove 18 of the or each bearing web 14 is limited by two lateral groove walls 26a, 26b and a groove base 28. In addition, it may be provided that the gap between the two groove walls 26a, 26b or the or of each groove 18 corresponds to a gap between the circular blades 6a, 6b of the circular blade pair 6. The circular blades 6a, 6b are preferably arranged parallel and/or coaxially to each other. For this they may have a common rotational axis A. The gap between the circular blades 6a, 6b is therefore preferably viewed in the direction of the rotational axis A. It is possible to achieve a particularly clean and/or precise incision by adjusting the gap between the groove walls 26a, 26b to the gap between the circular blades 6a, 6b or vice versa. Since due to this configuration, the groove walls 26a, 26b form a counter-support or a cutting counter-support for the circular blades 6a, 6b of the circular blade pair 6. The outer cutting edge 24 of each circular blade 6a, 6b of the circular blade pair 6 is preferably designed at an acute angle such that its thickness has no effect and/or only a slight effect on adjusting the gap between the groove walls 26a, 26b. If necessary, the thickness of the outer cutting edge 24 may be taken into account when adjusting the gap between the groove walls 26a, 26b. The groove walls 26a, 26b may be used as guide elements for the circular blades 6a, 6b while conveying fish through the cutting unit 4. It may additionally be provided that the gap between the groove walls 26a, 26b of the relevant groove 18 is enlarged by a tolerance variable, for example 10%, compared to the gap between the circular blades 6a, 6b in order to keep the mechanical wear as low as possible.

A further advantageous embodiment of the invention is characterised in that the circular blade pair 6 is at a distance from the associated groove base 28 on engaging in the groove 18 of the bearing web 14. Mechanical contact is therefore prevented between the groove base 28 and the circular blade pair 6 or its circular blades 6a, 6b. This ensures in a particularly easy and safe manner that the circular blade pair 6 or the circular blades 6a, 6b do not become blunt. At the same time, the gap between the groove base 28 and the circular blade pair 6 can be chosen in such a manner that no mechanical contact occurs even after a longish operating period and/or wear associated with this, in particular of a guide element of the conveyor. In this way, the maintenance costs can be reduced.

A further advantageous embodiment of the invention is characterised in that the groove walls 26a, 26b of the or each bearing web 14 are arranged conically and/or at an acute angle to each other in the region of an entry section 30. The entry section 30 of the groove walls 26a, 26b is arranged at the front viewed from conveying direction T. In other words, the entry section 30 is arranged in the region of the horn 22. These conically and/or acutely angled side walls 26a, 26b arranged in the region of the entry section 30 are suitable for "threading" or inserting the circular blade pair 6 into the groove 18. This effectively prevents the circular blade pair 6 from being destroyed when conveying fish through the cutting unit 4 by means of the supporting body 10. In other words, the circular blade pair 6 is prevented from coming into contact with the supporting body 10 or bearing web 14 in such a way that the circular blade pair 6 and/or the bearing web 14 is destroyed and/or the supporting body 10 jumps out of a guide of the conveyor. Consequently, the downtimes of the apparatus 2 for processing fish are minimised.

For an advantageous embodiment of the invention, it is moreover provided that the underside 32 of the bearing web 14 is of concave design. Thus, if the circular blade pair 6 should nevertheless jump out of the groove 18, it is guided back into the groove 18 by the concave design of the underside 32 of the bearing web 14. The concave underside 32 is therefore used for auto-stabilisation of cutting free the backbone.

A further advantageous embodiment of the invention is characterised in that the groove walls 26a, 26b of the or each bearing web 14 are aligned parallel to each other, preferably up to the entry section 30. As a result, it is possible to guide fish through the cutting unit 4 in a linear or in a purely translational motion. Due to this embodiment, the apparatus 2 can be designed particularly cost-effectively, for example by means of a linear guide of the conveyor.

A further advantageous embodiment of the invention is characterised in that the circular blade pair 6 can be brought out of a waiting position into a working position and/or vice versa using a positioning element of the cutting unit 4. In a waiting position, the circular blade pair 6 can be arranged in such a way that it does not collide with otherwise interfering elements of the revolving conveyor. Consequently, the circular blade pair 6 can be saved from destruction in a waiting position. In a working position, the circular blade pair can be arranged to engage in the groove 18 of a bearing web 14. As explained previously, this is also possible without destruction of the circular blade pair 6.

The invention claimed is:

1. An L-shaped supporting body for accommodating a fish and for conveying said fish tail first, through a cutting unit having a circular blade pair of a fish processing apparatus, which has a continuously revolving conveyor, wherein the supporting body has a main body for fastening said supporting body to the conveyor and a bearing web, which protrudes beyond a side wall of the main body and which has a supporting edge arranged at the top for accommodating the backbone of the fish to be accommodated, characterised in that the bearing web has a groove arranged on the underside, which groove is designed as a counter-support for the circular blade pair.

2. An L-shaped supporting body according to claim 1, characterised in that the groove of each bearing web extends over the entire length of said bearing web.

3. An L-shaped supporting body according to claim 1, characterised in that the groove of the bearing web is limited by two lateral groove walls and a groove base, wherein the groove walls of each bearing web are arranged conically to each other in the region of an entry section.

4. An L-shaped supporting body according to the preceding claim 3, characterised in that the groove walls of the bearing web are aligned parallel to each other, preferably up to the entry section.

5. An apparatus for processing fish, comprising a cutting unit, wherein the cutting unit has a circular blade pair for cutting free the backbone and a conveyor unit with a continuously revolving conveyor and at least one L-shaped supporting body for accommodating the fish and for conveying said fish tail first through the cutting unit, wherein each supporting body has a main body attached to the conveyor and a bearing web protruding beyond a side wall of the main body and which has a supporting edge arranged at the top for accommodating the backbone of each fish to be processed, characterised in that each L-shaped supporting body is designed according to claim 1.

6. Apparatus according to claim 5, characterised in that each bearing web protrudes beyond the associated main body of the supporting body transverse to a conveying direction of the conveyor.

7. Apparatus according to claim 5, characterised in that the groove of each bearing web is aligned in a conveying direction of the conveyor and/or in a rotational plane of the circular blade pair.

8. Apparatus according to claim 5, characterised in that each supporting body is guided by means of the conveyor when conveying fish through the cutting unit in such a way that the circular blade pair engages in the groove of the associated bearing web.

9. Apparatus according to claim 5, characterised in that a gap between the two groove walls of each bearing web corresponds to a gap between the circular blades of the circular blade pair.

10. Apparatus according to claim 5, characterised in that the circular blade pair is at a distance from the associated groove base on engaging in the groove of the bearing web.

11. Apparatus according to claim 5, characterised in that the circular blade pair can be brought out of a waiting position into a working position and vice versa using a positioning element of the cutting unit.

* * * * *